US011413593B2

(12) United States Patent
Monereau et al.

(10) Patent No.: US 11,413,593 B2
(45) Date of Patent: Aug. 16, 2022

(54) DEVICE FOR LIMITING OR ELIMINATING THE MIGRATION OF PARTICLES BETWEEN TWO LAYERS

(71) Applicant: L'Air Liquide, Société Anonyme pour l'Etude et l'Exploitation des Procédés Georges Claude, Paris (FR)

(72) Inventors: Christian Monereau, Montpellier (FR); Lian-Ming Sun, Villebon-sur-Yvette (FR); Bernard Fraioli, Draveil (FR); Benjamin Morineau, Kobe (JP); Vincent Gueret, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/259,414

(22) PCT Filed: Jun. 28, 2019

(86) PCT No.: PCT/FR2019/051611
§ 371 (c)(1),
(2) Date: Jan. 11, 2021

(87) PCT Pub. No.: WO2020/012087
PCT Pub. Date: Jan. 16, 2020

(65) Prior Publication Data
US 2021/0252468 A1 Aug. 19, 2021

(30) Foreign Application Priority Data
Jul. 11, 2018 (FR) ...................................... 1856371

(51) Int. Cl.
*B01D 53/04* (2006.01)
*B01J 8/00* (2006.01)
(Continued)

(52) U.S. Cl.
CPC ........ *B01J 8/0453* (2013.01); *B01D 53/0423* (2013.01); *B01J 2208/00884* (2013.01); *B01J 2208/025* (2013.01)

(58) Field of Classification Search
CPC ........ B01D 53/00; B01D 53/02; B01D 53/04; B01D 53/0407; B01D 53/0423;
(Continued)

(56) References Cited
U.S. PATENT DOCUMENTS 5,202,097 A   4/1993  Poussin
5,354,898 A * 10/1994  Schroeder ............. C07C 51/487
                                                    562/485
(Continued)

FOREIGN PATENT DOCUMENTS

EP    1 297 881    4/2003
FR    2 676 373    11/1992
(Continued)

OTHER PUBLICATIONS

International Search Report for corresponding PCT/FR2019/051611, dated Sep. 26, 2019.
(Continued)

*Primary Examiner* — Natasha E Young
(74) *Attorney, Agent, or Firm* — Elwood L. Haynes

(57) ABSTRACT

A device configured to be interposed between a lower layer and an upper layer of particles arranged inside a cylindrical shell, thereby limiting or preventing the migration of particles between the layers.

3 Claims, 1 Drawing Sheet

(51) Int. Cl.
*B01J 8/02* (2006.01)
*B01J 8/04* (2006.01)

(58) Field of Classification Search
CPC ......... B01J 8/00; B01J 8/02; B01J 8/04; B01J 8/0446; B01J 8/0449; B01J 8/0453; B01J 19/00; B01J 19/24; B01J 19/30; B01J 19/305; B01J 2208/00; B01J 2208/00796; B01J 2208/00884; B01J 2208/02; B01J 2208/023; B01J 2208/024; B01J 2208/025; B01J 2219/00; B01J 2219/24; B01J 2219/30; B01J 2219/302; B01J 2219/30257
See application file for complete search history.

(56) References Cited

U.S. PATENT DOCUMENTS

| | | | |
|---|---|---|---|
| 7,214,352 B2 * | 5/2007 | Poussin | B01J 8/008 422/218 |
| 7,323,152 B2 * | 1/2008 | Axon | C07C 45/38 423/240 R |
| 9,364,810 B2 * | 6/2016 | Merkel | B01J 8/44 |
| 2010/0316540 A1 | 12/2010 | Hamel et al. | |
| 2012/0237415 A1 | 9/2012 | Ramos et al. | |
| 2013/0296610 A1 | 11/2013 | Merkel et al. | |
| 2014/0216379 A1 | 8/2014 | Ratner | |

FOREIGN PATENT DOCUMENTS

| WO | WO 2004 005187 | 1/2004 |
|---|---|---|
| WO | WO 2009 103395 | 8/2009 |

OTHER PUBLICATIONS

International Search Report for related PCT/FR2019/051612, dated Sep. 9, 2019.

* cited by examiner

DEVICE FOR LIMITING OR ELIMINATING THE MIGRATION OF PARTICLES BETWEEN TWO LAYERS

CROSS REFERENCE TO RELATED APPLICATIONS

This application is a 371 of International Application No. PCT/FR2019/051611, now WO/2020/012087, filed Jun. 28, 2019, which claims priority to French Patent Application No. 1856371, filed Jul. 11, 2018, the entire contents of which are incorporated herein by reference.

BACKGROUND

The present invention relates to a device intended to be interposed between a lower layer and an upper layer of particles arranged inside a cylindrical shell, so as to limit or prevent the migration of particles between the layers.

This device, situated at the interface between the two particle mediums is porous to any fluids that might be circulating within the shell. It is designed to remain in contact both with the lower and upper layers even in the event of settling of these layers. It can be used in a reactor, an adsorber, or, more generally, in any storage capacity in which there is a desire for various layers of particles to be perfectly separated while at the same time leaving the possibility for a fluid to circulate freely. The cross section of said shell may be any, but will generally be circular, the shell then taking the form of a vertical-axis cylinder.

It is often the case in numerous industrial processes that there is a desire to superpose various layers of particles and prevent any mixing between these layers. The process for producing pure hydrogen using PSA (Pressure Swing Adsorption) is a typical example of this. The adsorbers used in such a process generally take the form of vertical-axis cylinders. From the bottom up, the shell may thus have an inlet/outlet for the circulating fluids (gas to be treated, residual gas, etc.), a support of the grating type for example, various layers of inert particles facilitating correct distribution of the gas across the entire cross section of the adsorber (ceramic beads or any other product of varying shapes and developed for this use), and then, arranged one on top of the other, the various layers of adsorbents chosen to optimize the separation of the hydrogen from the impurities. If the gas that is to be treated originates from a steam reforming process, there might then be, in succession, activated alumina, active carbon and several types of zeolite (5A, 13X, LiLSX, etc.) to successively halt water, secondary impurities, $CO_2$, methane, carbon monoxide and nitrogen. Above the last layer of an adsorbent, there may once again be inert beads intended to reduce the dead volume of the upper dome of the adsorber, to facilitate good distribution of the gas, prevent particles of adsorbent from moving, etc. The various layers there will be have variously differing characteristics. They may thus be differentiated:
  by shape: beads, saddles, sticks, pellets, sheets, granules, crushed material, barrels (perforated pellets), etc.
  by dimensions: from a few centimeters for the supporting elements to less than a millimeter for certain layers of zeolite for example, etc.
  by density: from less than 500 grams per liter for active carbon to several kilograms in the case of steel beads used as inert elements, etc.
  by surface condition ranging from smooth wall (ceramic, certain adsorbents, etc.) to rough wall (active carbon, etc.), or even angular or having roughnesses.

It will be noted that there may be a desire to separate two successive layers of identical products. Certain adsorbents (active carbon, zeolites) may for example be regenerated by the supplier after a first use during which they have become contaminated, generally with moisture. After treatment, they then regain almost all of their initial capacity but as a safety precaution will generally be used as a guard layer underneath one and the same adsorbent in the fresh or uncontaminated state, rather than mixed therewith.

It will be appreciated that, in the case of H2 PSA for example, any mixing of layers would have negative effects on the process. It could lead to local partial blockages resulting in defective distribution of the circulating fluids, to layers of nonuniform thickness, to the presence of an adsorbent in zones in which this adsorbent should not be present (risk of poisoning if it is closer to the feed inlet than intended and is brought into the presence of impurities incompatible with its correct operation, risk of ineffectiveness if, on the other hand, it finds itself in a zone closer to the outlet than intended, this time in the presence of impurities for which it exhibits only a very limited affinity).

As far as possible, a person skilled in the art will use a succession of particulate materials which by nature are unable to mix. The beads that support the adsorbents or catalysts and that distribute the fluids are the best example of this. Suppliers have developed ranges of products the layered successive use of which avoids any possibility of mixing, even at the wall.

There are two important points that should be immediately noted when discussing layers of particulate materials:
  the mutual arrangement of the particles within the one same layer is dependent on how the layer has been filled. The void fraction of the bed thus formed is variable and, for a bed of beads of uniform size, will be able to range, in practice, for example from 0.34 to 0.39, whereas in theory the potential range between the geometrically possible extremes of stacking will be even greater. In the case of bead populations exhibiting a certain spread on the diameter, this void fraction may be lower. Likewise, spread on the sphericity may lead to beds exhibiting greater or lesser amounts of settling. This has a direct impact on the density of the bed which is said to be a dense-packed bed or, in the opposite case, a loose-packed bed. These effects are well known and in particular make it possible to determine, for a given population, the free cross-sectional area through which particles of a smaller size are able to insinuate themselves and, as a result, work their way progressively down through the bed. This approach is more awkward in the case of particles of varying shapes, and tests may be needed in order to determine the void fraction and limit interpenetration.
  The wall creates a discontinuity in the arrangement of the particles of a bed. Because the surface of the wall is generally planar, the local void fraction is different than that within the bed. This void fraction is very generally higher at this point and this has a knock-on effect over a distance of several particles. As before, these effects have been studied and are known to those skilled in the art.

Thus, in order to support an adsorbent bed made up of near-spherical beads (sphericity greater than 0.95), with a mean diameter of 3.0 mm, and fewer than 1% of the beads having a diameter smaller than 2.7 mm, it is possible to place, in succession, on top of the support grid, 10 cm of ceramic beads 20 mm in diameter, then 10 cm of 10-mm beads, and finally 10 cm of 5-mm beads. This will then ensure correct distribution of the circulating fluids and provide support without risk of interpenetration, even at the wall.

This highly-favorable textbook scenario is unfortunately not encountered in industrial applications, and it is often necessary to provide a system for preventing the mixing of two particle populations laid ne on top of the other. The need to install such a system may be associated with the respective physical characteristics of the two layers in contact and/or with the usage of the materials.

The physical characteristics include the respective dimensions and densities of the particles of the two layers. It may be necessary for example to use a first layer of adsorbent of relatively large dimension in order to limit pressure drops, followed by a thin layer of small dimension in the frontal zone in order to improve process performance. Upwards of a factor of 2 to 2.5 on the dimensions, there is a risk that the smaller beads will work their way down into the lower layer, particularly near the wall. Another scenario that exhibits risks of mixing is a scenario in which the upper layer is made up of particles of a density higher than those of the lower layer. Because of their greater weight, the particles at the top may locally part the particles of the lower bed and progressively work their way down through this layer as a result of the relative mobility of the materials. There are also events that can lead to a mixing of layers that are apparently stable. These may include knocks or vibrations caused during transport or through the proximity of machinery. The fluids circulating through the various beds may also cause mixing, whether as a result of their high speed or as a result of changes in conditions. These may be events that occur during normal operation (for example each time valves are opened) or accidentally (inopportune opening of a valve, etc.).

It will be noted that in certain cases it is possible to add, in between two successive layers that have been determined as being optimal with respect to the process, an intermediate layer the role of which will be to prevent any migration of particles. This layer may be inert with respect to the process, or merely non-optimal. For example, in a stack comprising a layer of activated alumina 2 mm in diameter normally topped by a layer of zeolite 0.6 mm in diameter, a buffer layer, a few centimeters thick, of zeolite 1.2 mm in diameter, may be interposed between them to avoid the risks of migration. Aside from the slightly unfavorable effect associated with slower kinematics, this complicates the filling by adding a further material that has to be introduced carefully, given the minimal height that is to be installed.

With this as a starting point, one problem that arises is that of providing an improved means for limiting or preventing the migration of particles between at least two layers of different particulate materials.

SUMMARY

A solution of the present invention is a device intended to be interposed between a lower layer and an upper layer of particles arranged inside a cylindrical shell, so as to limit or prevent the migration of particles between the layers, said device comprising:
  i) a sealing disk made of fabric or of mesh, having:
    a diameter substantially equal to the internal diameter of the cylindrical shell, and
    meshes of equivalent diameter smaller than the equivalent diameter of the particles,
and
  ii) a ring of fabric having:
    meshes of equivalent diameter smaller than the equivalent diameter of the particles,
    a length equal to the internal perimeter of the base of the cylindrical shell,
    an upper part having an upper end intended to be attached along its entire length to the internal wall of the cylindrical shell, and
    a lower part intended to be laid on the lower layer of particles or on the sealing disk,
with the sealing disk and the lower part of the ring of fabric being superimposed and the overlap between the disk and the ring of fabric being less than 150 millimeters, preferably less than 100 millimeters.

The "equivalent diameter" of a particle is that of the sphere of the same specific surface area, the specific surface area being the area with respect to the volume of the particle concerned.

The statement that the mesh size of the fabric is smaller than the equivalent diameter of the particles in fact means smaller than the smallest of the equivalent diameters of the particles of the upper and lower layers. In the event of spread of the particle size, it may even be desirable to have a mesh size smaller not than the equivalent diameter but rather smaller than the smallest particles.

The term "fabric" is given a very general meaning here, defining a flexible material made up of filaments and having free passages allowing the circulation of a fluid, and more particularly of a gas. The fabric will preferably be a woven. What is preferably meant here by "woven" is an element obtained by interlacing filaments and having regular openings. The fabric may be woven and obtained by interlacing parallel taut filaments (warp filaments) and filaments running perpendicular to these (weft filaments) using suitable tooling (shuttle, gripper, projectile weaving, etc.). There are a great many possible weaves that can be obtained according to the ways in which the filaments are interlaced and the characteristics of the warp and weft filaments (plain square weave, square crossweave, crossweave, floated weaves, herringbone, etc.).

The fabrics cover a fairly broad field, with filaments the diameter of which may range from the order of one millimeter to several tens of microns, most being comprised between 0.5 mm and 40 microns. The opening (void) is generally comprised between several millimeters and around one hundred microns. The void fraction itself ranges from 20 to 80%, more usually from 30 to 70%.

A flexible fabric may have a tendency to pucker or to curl at its ends. There may be a need to add stiffeners, once it is in place, in order to avoid these disadvantages. These may for example be rods that keep it in a planar position. Such devices, if present, do not in any way alter the principle of the invention.

It may be advisable to use, for the disk, a more rigid material that will be referred to here as a mesh without prejudice to the way in which it is manufactured or the mechanical characteristics thereof, In general, this disk will therefore be made up of several pre-cut sectors so that it can be introduced into the shell more easily. These sectors, for example two half-sections, may be joined together (stitched together using a metal filament for example) in order to offer the required level of sealing once in place inside the shell.

What is meant by a "disk having a diameter substantially equal to the diameter of the shell" is that it is necessary to account for the manufacturing tolerances on the shell-ring and on the disk and for the ease of introduction of the latter into the shell. Thus, the diameter of the disk will be, for example, the internal diameter of the shell, + or −10 mm. In the case of a relatively rigid disk (of mesh according to the terminology we are using here), steps will be taken to ensure that its diameter is slightly smaller than that of the shell-ring in order to facilitate correct placement. The aim will then be rather +0, −20 mm.

In the device according to the invention, the material of the ring will, for its part, be the flexible fabric, the constituent material being selected from metals or polymers.

By way of example, the fabric used in the context of the invention may be a fabric made from interlaced stainless steel filaments 0.2 mm in diameter, with openings measuring 0.45 mm by 0.45 mm.

Through its features, the device according to the invention may be considered as being a floating system. Specifically, what is meant by a "floating system" is a device that remains in contact with the upper and lower layers, even in the event of settling of the beds ("bed" means "layer"), particularly of the lower bed. This settling over the course of time (transport, operation, etc.) will be to a greater or lesser extent depending on the quality of the initial fill with the particles, but generally remains small in extent. It may for example be by the order of 1 to 5 centimeters maximum, for a bed with an initial height of one meter. In addition, this settling generally affects the entire mass of the particulate material, which means that the upper interface of the layer subject to this phenomenon remains approximately horizontal. The device adopted for achieving separation, that accompanies the downward movement of the particles on which it rests, therefore remains in contact with the lower layer, the movement of which it follows, and of course with the upper layer, which is always resting on it and facilitates this contact. One of the benefits of the floating system is that the upper layer of particles applies pressure to the interface with the lower layer, limiting the possibilities for movement of the particles. The risks of attrition are thus reduced and higher flow velocities can generally be used for the circulating fluids. This is often the role of the layer situated right at the top of the shell, for which a material with a high density (ceramic, metal, etc.) is therefore chosen.

It should be noted that what is meant by the settling of the lower layer is, in practice, the settling of any various lower layers there might be. Specifically, from the moment that the various layers start to rest against one another, the settling of the first layer is passed on to all the layers above.

As a preference, the upper part of the ring has elasticity allowing it to lengthen in order to compensate for up to 25 mm of settling of the lower layer of particles. This elasticity will be intrinsic or obtained by shaping.

Depending on the case, the device according to the invention may have one or more of the following features:
 the overlap between the disk and the ring will be at least 25 mm;
 the ring of fabric comprises metal or polymer filaments with a diameter less than or equal to 200 microns;
 the sealing disk comprises metal or polymer filaments with a diameter greater than or equal to 200 microns.

The principle behind the invention is that the sealing at the periphery be achieved independently of the main sealing which is itself achieved in the conventional way using a sealing disk made of fabric or mesh. The sealing at the periphery is therefore achieved simply as a result of the overlap between the ring of fabric attached to the wall of the shell-ring and the sealing disk without there being any system for connecting one to the other. It is simply the weight of the upper layer of particles that ensures and maintains contact between the two surfaces. If it is placed on top, the sealing disk may also encourage this contact as a result of its own weight.

The overlap must of course be sufficient to prevent particles from migrating between the ring and the sealing disk, not only during filling but also during operation of the unit. There is therefore a case for taking the settling of the lower layer (or layers) into account.

Regarding the settling, it should be borne in mind that the gas-production or gas-separation processes for which this separation system is preferentially intended need to have maximum filling densities in order to perform well, and for charging them with particulate materials (catalysts, adsorbents, etc.) employ suitable methods and devices to allow the particles to rain down and achieve this dense-fill result. The residual settling which may occur is therefore small, of the order for example of 0.5 to 2%. Thus, a layer 2 m thick will generally settle by only 10 to 40 mm. This length needs to be added to the minimum overlap desired. It will be noted that the movements of the device according to the invention will generally be very slow if the unit has been filled correctly and operated in accordance with the rules of the art, otherwise it will be necessary to select, for the ring of fabric and the fabric disk, materials the surface appearance of which allows for such slippage. This generally is the case using standard fabrics and meshes. It will also be appreciated that the material of the sealing fabric needs to be flexible enough to be able to bend and to continue to be applied closely against the wall of the shell-ring during settling.

By adding to the settling a minimum residual overlap of 25 mm, or 20 times the diameter of the smallest particles, the dimension for the width of the lower part of the ring of fabric is obtained, to a first approximation. For a bed 2 meters high made up of beads of adsorbent 2 mm in diameter, a minimum working width of 80 mm is obtained for the lower part of the ring of fabric which is intended to be laid on the lower layer of particles or the sealing disk, although more probably, because of the usual quality of filling, this will be of the order of 50 to 60 mm. It will be appreciated that the better settled and the lower the thickness of the lower layer, the smaller the necessary overlap will be. An overlap of 25 to 40 mm for example will then be envisioned. Below 25 mm, sealing in most cases becomes questionable.

The device according to the invention may potentially have the following feature:
 The upper part of the ring, namely the part attached to the cylindrical shell, has the property of being able to lengthen so as to at least partially accompany the movement of the sealing disk in the event of settling of the lower layer (or layers).

This elasticity of the material may be intrinsic (polymer fabric for example) or created through local deformations applied at least locally to said fabric (metal fabric having small pleats for example). In both instances, this elasticity will allow the ring, under the effect of the weight of the upper layer of particles, to lengthen by a few millimeters, or even by a few centimeters in order to at least partially compensate for the settling. The (horizontal) lower part of the ring may then remain almost immobile with respect to the sealing disk or, at the very least, limit its relative motion with respect to the disk.

The constituent material and diameter of the ring of fabric and of the sealing disk, and the dimensions of the openings determine their mechanical strength and their stiffness (or flexibility). For this application, use is preferably made of stainless steel filaments. Filaments with a diameter equal to or less than 200 microns, preferably of the order of 100 microns ensure that the strip used for peripheral sealing is sufficiently flexible. Filaments with a diameter greater than or equal to 200 microns, preferably greater than or equal to 250 microns, give the sealing disk a certain stiffness. However, there is generally no case for using filaments of a diameter greater than 1000 microns. The choice of diameter for the filaments of which the sealing disk is made is generally the result of a compromise between flexibility and mechanical strength. In practice, use will be made of larger diameter filaments in the case of large particles, for example beads 10 mm in diameter.

As will now be demonstrated, it is important to minimize the width of the lower part of the sealing ring.

A shell-ring with an inside diameter of 2000 mm will be considered as an example of how to do this. As it is desirable not to have any cut in the fabric that is going to be placed at the periphery, this fabric will be made of a strip measuring 6280 mm long (neglecting the overlapping of the strip at the ends).

If, as a safety measure, there were a desire to use for example a ring having a lower part with a width of 500 mm, the inside diameter (which means to say the diameter of the circle left free at the center of the ring) would then be 1000 mm, and the corresponding circumference would be just 3140 mm. In practice, that means that the strip is locally too long by a factor of two. It will therefore position itself as best it could on the lower layer of beads, creating pleats of haphazard dimensions and orientations. Simple tests demonstrate that pathways can then form, offering enough space for the particles to pass. If, on the other hand, a thickness of 60 mm is adopted for the lower part of the ring, the internal circumference will then be equal to around 5900 mm. This then moves from a surplus length of over 3 m to under 0.4 m, or more specifically, in terms of a percentage of the strip length, from 50% to 6%. There is then no longer the risk of having large pleats which overlap and form so many potential pathways for the particles.

It will be noted that the system according to the invention is particularly well-suited to large-diameter shells. The introduction of the sealing ring is therefore all the easier. This may also allow the use of greater widths of overlap without the creation of pleats liable to create passages that act as pathways for the particles.

It will also be noted that it is possible, in some instances, by means of prior shaping, to limit, or even eliminate, the above-mentioned surplus length. Certain metal fabrics, for example formed initially by square interlacing, can be stretched locally to form lozenge shapes. The part thus stretched experiences a change in geometry, it being possible for the width to be increased and the length at the same time reduced. Such a method is used to give metal fabrics varying shapes. Applied here, it would allow the fabric to be given the geometric dimensions of a perfect ring.

Another subject of the present invention is a unit comprising:
 a cylindrical shell,
 a lower layer and an upper layer of particles, which layers are superposed in said shell,
 a device as defined in the invention interposed between the lower layer and the upper layer of particles.

Depending on the case, the unit according to the invention may have one or more of the features below:
 said device covers the entirety of the cross section of the cylindrical shell.
 the cylindrical shell comprises an inlet, an outlet, fluid inlet pipework means coupled to the inlet, and fluid outlet pipework means coupled to the outlet,
 the particles are selected from adsorbent particles, catalytic particles and inert particles acting as a support, serving to distribute the fluids, or serving to fill dead volumes.
 said unit is a catalytic reactor or an adsorber.

As a preference, the upper part of the ring of fabric will be applied firmly against the internal wall of the cylindrical shell.

Another subject of the present invention is a method for manufacturing a device according to the invention, comprising the following steps:
 a) preparing a strip of fabric having meshes of an equivalent diameter smaller than the equivalent diameter of the particles and a length equal to the internal perimeter of the base of the cylindrical shell,
 b) forming a ring of fabric from the strip of fabric by joining together the two widths of the strip of fabric,
 c) defining the upper part and the lower part of the ring of fabric,
 d) preparing a sealing disk made of fabric or of mesh having a diameter substantially equal to the internal diameter of the cylindrical shell, and meshes of an equivalent diameter smaller than the equivalent diameter of the particles,
 e) superposing the lower part of the fabric and the sealing disk, with steps a) and c) being such that, after step e), the observed overlap between the disk and the ring of fabric is less than 150 millimeters, preferably less than 100 millimeters.

The strip of fabric chosen in step a) will preferably be essentially rectangular. What is meant here by essentially is approximately, namely, for example as regards the shape of the strip of fabric, that this strip need not be absolutely rectangular in the strict geometrical sense, but may deviate from this ideal geometry a little, by a few percent, whether this be in terms of the dimensions or in terms of the angles. Regarding the length, depending on the method used for attaching the fabric to the shell-ring, it may be appropriate to allow for a few centimeters of overlap at the ends.

A final subject of the present invention is a method for manufacturing a unit according to the invention, comprising the following steps:
 a) manufacturing the device as defined in the invention, made up of a ring of fabric and of a sealing disk,
 b) attaching the upper end of the upper part of the ring of fabric obtained in step a) along its entire length to the internal wall of the cylindrical shell,
 c) raising the lower part of the ring of fabric obtained in step a) and keeping said lower part applied firmly against the internal wall of the cylindrical shell,
 d) introducing particles into the cylindrical shell in such a way as to form an upper layer of particles underneath the ring of fabric obtained in step a),
 e) releasing the lower part of the ring of fabric obtained in step a) from being kept firmly applied to the internal wall of the cylindrical shell so that the lower part settles down onto the lower layer of particles,
 f) positioning the sealing disk obtained in step a) on the lower part of the ring of fabric, and
 g) introducing particles into the cylindrical shell in such a way as to form an upper layer of particles on top of the sealing disk.

According to a second alternative, the method for manufacturing the unit according to the invention comprises the following steps:

a) manufacturing the device as defined in the invention, made up of a ring of fabric and of a sealing disk, b) attaching the upper end of the upper part of the ring of fabric obtained in step a) along its entire length to the internal wall of the cylindrical shell, c) raising the lower part of the ring of fabric obtained in step a) and keeping said lower part applied firmly against the internal wall of the cylindrical shell, d) introducing particles into the cylindrical shell in such a way as to form a lower layer of particles underneath the ring of fabric obtained in step a), e) positioning the sealing disk obtained in step a) on the lower layer of particles, f) releasing the lower part of the ring of fabric obtained in step a) from being kept firmly applied to the internal wall of the cylindrical shell so that the lower part settles down onto the sealing disk, and g) introducing particles into the cylindrical shell in such a way as to form an upper layer of particles on top of the lower part of the ring of fabric placed upon the sealing disk.

Depending on the case, the method for manufacturing the unit according to one or other of these alternatives may have one or more of the following features:

- in step c) said lower part is kept firmly applied to the internal wall of the cylindrical shell by means of temporary fixings preferably chosen from magnets and adhesives;
- in step b), the attaching of the upper end of the upper part of the ring of fabric obtained in step a) along its entire length to the internal wall of the cylindrical shell is achieved using curved retaining bars;
- the curved retaining bars are welded, screwed via studs attached to the cylindrical shell and/or bonded to the cylindrical shell. If necessary, additional sealing can be achieved by means of a gasket.

Note that the "retaining bars" may also be referred to as "flat bars". They will preferably be organized in sectors.

The device according to the invention is preferably made of stainless steel but could be made from other metallic materials (carbon steel, aluminum, etc.) and/or polymers, definitive attachment of the upper part of the ring of fabric to the cylindrical shell will preferably be achieved by welding, screwing and/or bonding and the temporary attachments of the lower part of the ring of fabric to the cylindrical shell will preferentially be achieved using magnets, adhesive devices or strips.

As a preference, use will be made of retaining bars attached beforehand to either side of the edge of the ring of fabric in order to weld it to the cylindrical shell to which a reinforcement will also have been welded beforehand at the appropriate height.

This need to operate inside the cylindrical shell in order to perform these attachment operations also leans towards this device being reserved preferably for shells of sufficiently large diameter. A minimum value of 750 mm would appear to be a sensible choice.

By lifting up the lower part of the ring of fabric and applying it closely against the wall using a temporarily device, the cross section of the cylindrical shell is essentially free and will allow for very effective filling, the particles raining down, through the use of a suitable filling method, not encountering any obstacle as they fall.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1A:
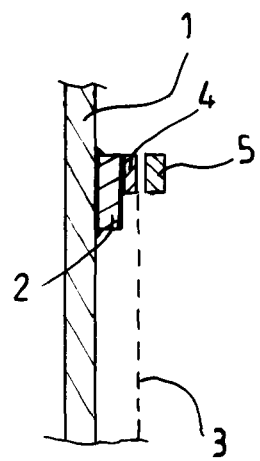
FIG. 1a is a schematic representation indicating the attachment of the upper part of the ring of fabric inside the cylindrical shell, in accordance with one embodiment of the present invention.
Figure 1B:
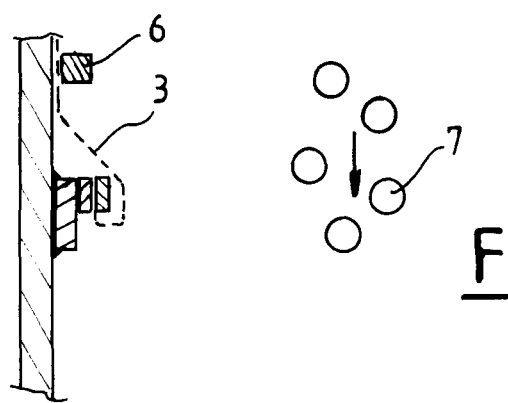
FIG. 1b is a schematic representation indicating the position of the lower part of the ring of fabric during filling, in accordance with one embodiment of the present invention.
Figure 1C:
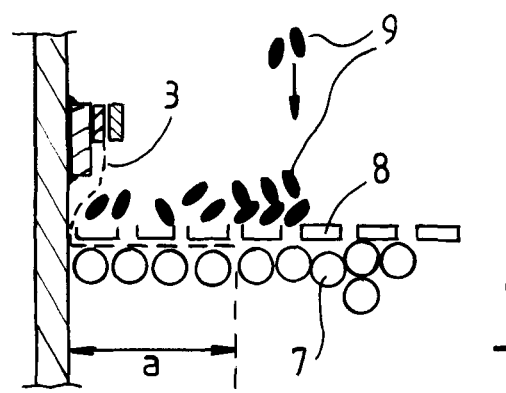
FIG. 1c is a schematic representation indicating the position of the fabric after filling, in accordance with one embodiment of the present invention.

Diagram 1.a corresponds to the attaching of the upper part of the ring of fabric inside the cylindrical shell. Diagram 2.b illustrates the position of the lower part of the ring of fabric during filling, and diagram 1.c illustrates the position of the fabric after filling. These are views of the cylindrical shell in cross section confined to the point at which the ring of fabric is attached. The numerical reference 1 corresponds to the cylindrical shell, the reference 2 corresponds to the reinforcement welded to the cylindrical shell along a circumference. The upper part of the ring of fabric 3 is attached to this reinforcement via its retaining bars 4 and 5 which are bent to the dimensions of the shell. In practice, these will be cut into sectors for ease of handling. Diagram 1.b shows the same ring of fabric with the lower part lifted up and applied firmly against the wall by a system of magnets 6. In this position, the shell can then be filled with the particles 7 up to the desired level. Diagram 1.c corresponds to the filling of the shell with the upper layer of particles (9). Note that in the meantime, the sealing disk has been superposed with the lower part of the ring of fabric 3, The overlap between the lower part of the ring of fabric 3 and the sealing disc 8 of which the diameter is that of the cylindrical shell is indicated by "a". In the case of an adsorber used on a unit for producing oxygen from atmospheric air, such a system placed between 2 successive layers of adsorbent could expect settling of the order of 10 mm, and the overlap would be such that was of the order of 40 to 50 mm. This is sufficient to avoid any interpenetration of the particles at the wall.

The invention relates more particularly to gas-production or gas-purification processes employing cylindrical sheds, these sheds being essentially catalytic reactors or adsorbers.

What is meant by adsorbers is devices implementing adsorption methods. A distinction is made between TSA and PSA adsorbers.

The adsorption cycles differ firstly in the way in which the adsorbent is regenerated. If the regeneration is performed essentially by increasing the temperature, then the method is a temperature swing adsorption (TSA) process. If, on the other hand, the regeneration is performed by decreasing the pressure, then the method is a pressure swing adsorption (PSA) process; in general, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time);
- VSA processes, in which the adsorption is carried out substantially at atmospheric pressure, preferably between 0.95 and 1.25 bar abs, and the desorption pressure is lower than atmospheric pressure, typically from 50 to 400 mbar abs;
- MPSA or VPSA processes, in which the adsorption is carried out at a high pressure greater than atmospheric pressure, typically between 1.35 and 6 bar abs, and the desorption is carried out at a low pressure lower than atmospheric pressure, generally of between 200 and 650 mbar abs;
- PSA processes proper, in which the high pressure is substantially greater than atmospheric pressure, typically between 3 and 50 bar abs, and the low pressure is substantially equal to or greater than atmospheric pressure, generally between 1 and 9 bar abs;
- RPSA (Rapid PSA) processes, for which the duration of the pressure cycle is typically less than a minute
- URPSA (Ultra Rapid PSA) processes, for which the duration of the pressure cycle is of the order of a maximum of a few seconds. It should be noted that these various designations are not standardized and that, in particular, the indicated limits are subject to variation according to the authors. The vast majority of adsorption processes employ several beds of particles, whether these be inert (support, etc.) particles or adsorbents, and there is generally a case for separating at least two successive layers using a suitable system.

More particularly, the invention will be applied to the process for producing oxygen from atmospheric air using pressure swing adsorption comprising a plurality N (N> or =1) of vertical-axis cylindrical adsorbers employing in each of its adsorbers at least one device according to the invention, this device being situated between an inert support bed and the first adsorbent layer essentially intended to halt the atmospheric moisture (silica gel, activated alumina, type X zeolite, etc.) and/or between two successive layers of adsorbent (for example activated alumina and LiLSX, etc.) and/or between the upper layer of adsorbent and a material used for filling the upper dome (for example between LiLSX and ceramic beads).

The moisture and the CO2 which are contained in the atmospheric air are poisonous to the zeolites used in this application, especially when this zeolite performs well at separating O2/N2. The charges of adsorbent need to be introduced quickly in order to minimize their contact with the atmosphere. The device according to the invention meets this requirement perfectly.

In general, in this type of unit, the adsorbers are of relatively large diameter, often in excess of 1500 mm, and relatively short height, often less than 1500 mm, and are filled with various layers of adsorbents using a device that allows dense filling, all of these being criteria which push for the use of a system according to the invention.

The scope of the invention is restricted to the cylindrical shells that constitute the vast majority of the shells used in particular in chemical or petrochemical processes. If necessary, this invention could be adapted to suit other geometries, retaining the fact that sealing at the periphery is achieved independently of the main sealing which, itself, covers most of the cross section of the shell, and the fact that there is no system for connecting one to the other.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device configured to be interposed between a lower layer and an upper layer of particles arranged inside a cylindrical shell, thereby limiting or preventing the migration of particles between the layers, said device comprising:
   i) a sealing disk comprising fabric or of mesh, comprising:
      a diameter substantially equal to the internal diameter of the cylindrical shell, and
      meshes of equivalent diameter smaller than the equivalent diameter of the particles,
   and
   ii) a ring of fabric comprising:
      meshes of equivalent diameter smaller than the equivalent diameter of the particles,
      a length equal to the internal perimeter of the base of the cylindrical shell,
      an upper part having an upper end intended to be attached along its entire length to the internal wall of the cylindrical shell, and
      a lower part configured to be laid on the lower layer of particles or on the sealing disk,
   with the sealing disk and the lower part of the ring of fabric being superimposed and the overlap between the disk and the ring of fabric being less than 150 millimeters,
      wherein the ring of fabric comprises metal or polymer filaments with a diameter less than or equal to 200 microns.

2. A device configured to be interposed between a lower layer and an upper layer of particles arranged inside a cylindrical shell, thereby limiting or preventing the migration of particles between the layers, said device comprising:
   i) a sealing disk comprising fabric or of mesh, comprising:
      a diameter substantially equal to the internal diameter of the cylindrical shell, and
      meshes of equivalent diameter smaller than the equivalent diameter of the particles,
   and
   ii) a ring of fabric comprising:
      meshes of equivalent diameter smaller than the equivalent diameter of the particles,
      a length equal to the internal perimeter of the base of the cylindrical shell,
      an upper part having an upper end intended to be attached along its entire length to the internal wall of the cylindrical shell, and
      a lower part configured to be laid on the lower layer of particles or on the sealing disk,
   with the sealing disk and the lower part of the ring of fabric being superimposed and the overlap between the disk and the ring of fabric being less than 150 millimeters,
      wherein the sealing disk comprises metal or polymer filaments with a diameter greater than or equal to 200 microns.

3. A method for manufacturing a device configured to be interposed between a lower layer and an upper layer of particles arranged inside a cylindrical shell, thereby limiting or preventing the migration of particles between the layers, said device comprising:
   i) a sealing disk comprising fabric or of mesh, comprising:
      a diameter substantially equal to the internal diameter of the cylindrical shell, and meshes of equivalent diameter smaller than the equivalent diameter of the particles,
and
ii) a ring of fabric comprising:
  meshes of equivalent diameter smaller than the equivalent diameter of the particles,
  a length equal to the internal perimeter of the base of the cylindrical shell,
  an upper part having an upper end intended to be attached along its entire length to the internal wall of the cylindrical shell, and
  a lower part configured to be laid on the lower layer of particles or on the sealing disk,
with the sealing disk and the lower part of the ring of fabric being superimposed and the overlap between the disk and the ring of fabric being less than 150 millimeters, the method of manufacturing comprising:
  a) preparing a strip of fabric having meshes of an equivalent diameter smaller than the equivalent diameter of the particles and a length equal to the internal perimeter of the base of the cylindrical shell,
  b) forming a ring of fabric from the strip of fabric by joining together the two widths of the strip of fabric,
  c) defining the upper part and the lower part of the ring of fabric,
  d) preparing a sealing disk made of fabric or of mesh having a diameter substantially equal to the internal diameter of the cylindrical shell, and meshes of an equivalent diameter smaller than the equivalent diameter of the particles,
  e) superposing the lower part of the fabric and the sealing disk,
with steps a) and c) being such that, after step e) the observed overlap between the disk and the ring of fabric is less than 150 millimeters.

\* \* \* \* \*